Figure 1:
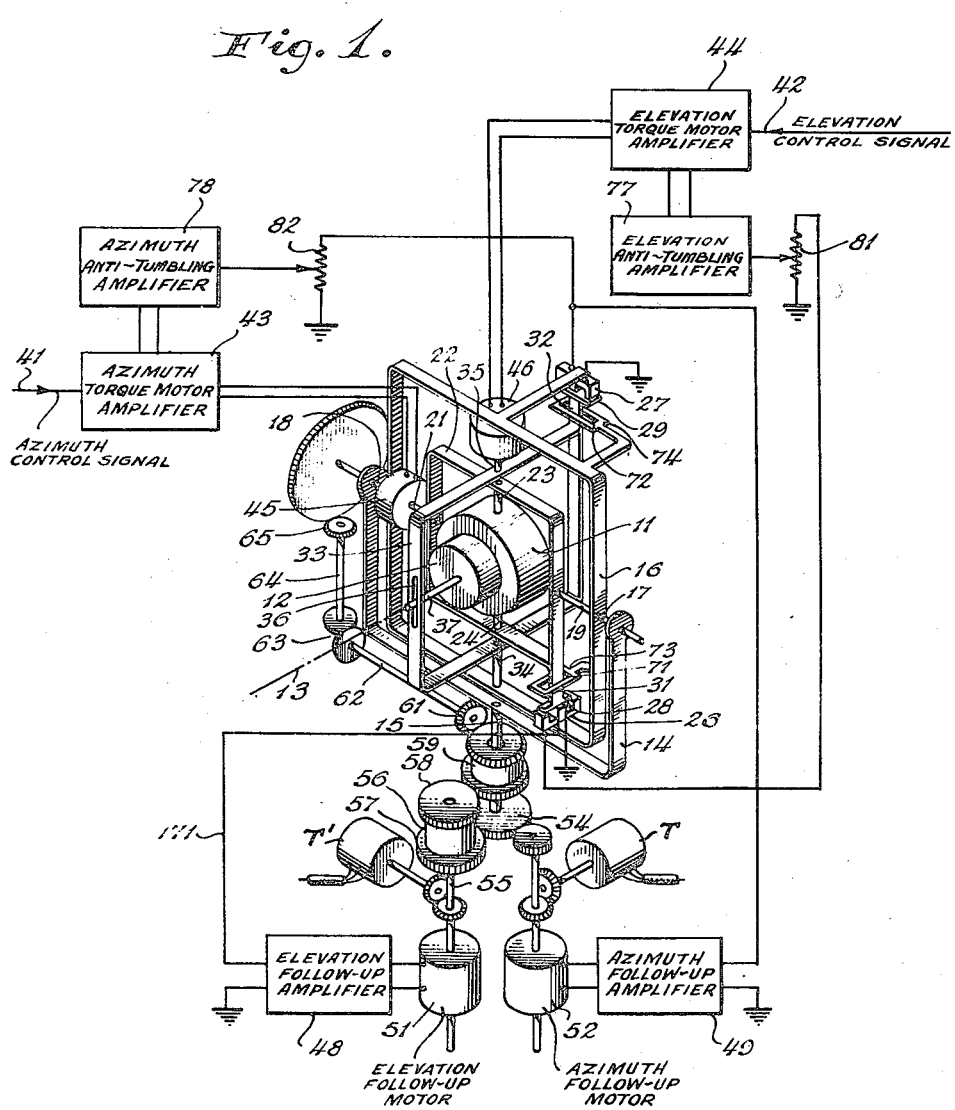

Jan. 3, 1950 G. C. NEWTON, JR 2,493,015
GYRO ANTITUMBLING DEVICE
Filed Oct. 2, 1944 2 Sheets-Sheet 1

INVENTOR
GEORGE C. NEWTON, JR.
BY
his ATTORNEY.

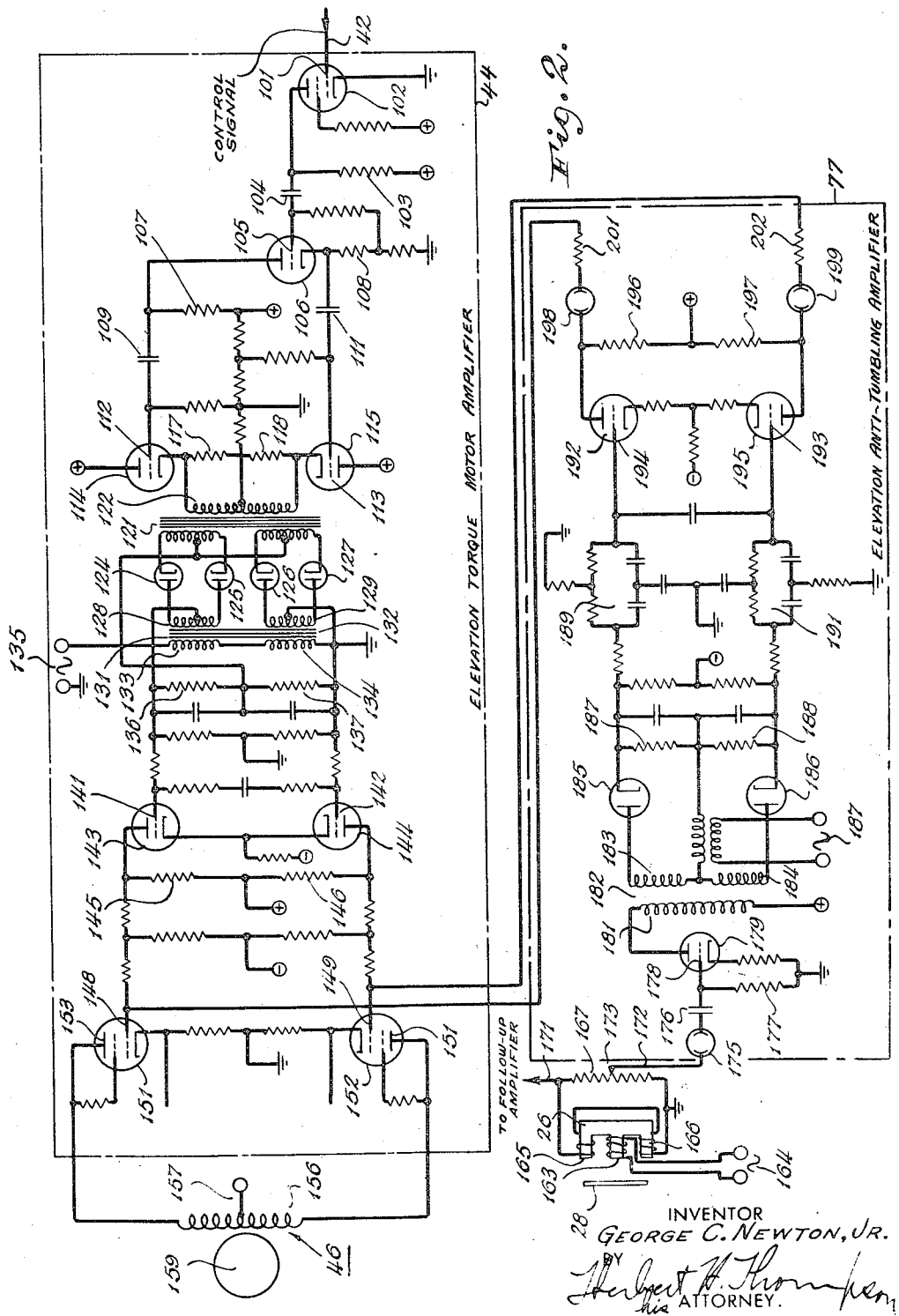

Patented Jan. 3, 1950

2,493,015

UNITED STATES PATENT OFFICE 2,493,015

GYRO ANTITUMBLING DEVICE

George C. Newton, Jr., Hempstead, N. Y., assignor to The Sperry Corporation, a corporation of Delaware Application October 2, 1944, Serial No. 556,868

8 Claims. (Cl. 74—5.2)

This invention relates generally to gyro control systems and particularly concerns improved control apparatus for preventing upsetting or otherwise disturbing of a sensitive gyroscope such as used in fire control both to direct and stabilize the gun or turret.

Such a gyro is usually provided with a follow-up member or housing having limit stops, so that when rapid or highly accelerated movements of the housing or precession of the gyro cause the positional deviation between the gyro and its follow-up member to become too great, the gyro strikes such stops in the housing. When this occurs, the mechanical stop applies a very large torque to the gyro, causing it to tumble or upset thus rendering it unfit for its designed functions. The engagement of the gyro with the stop is sometimes referred to as caging while the effect on the gyro is referred to herein as tumbling.

A major object of this invention is to provide improved gyro control apparatus for preventing caging and consequent temporary upsetting or tumbling of the gyro.

Another object of the invention is to provide a gyro follow-up control system in which excessive positional deviation between the gyro and its follow-up so controls the precession of the gyro to prevent tumbling.

A more specific object of the invention is to provide a gyro control system in which error signals corresponding to positional deviation between the gyro and its follow-up member control follow-up apparatus for positioning the member and abnormal error signals control the application of torque to the gyro to precess it in a manner to reduce the positional deviation.

Other objects and advantages of the invention will become apparent from the following specification taken in connection with the accompanying drawings, wherein:

Fig. 1 is a schematic illustration of a gyro control system embodied in the invention; and Fig. 2 is a schematic wiring diagram of the follow-up and anti-cage amplifiers shown in Fig. 1.

In accordance with the invention in its preferred form, pick-offs are provided to produce signals corresponding to positional deviations between a gyro and its follow-up member. These signals control follow-up motors which drive the follow-up member about mutually perpendicular axes, so it follows the gyro. These signals may be produced by positional deviation resulting from precession of the gyro or movement of the housing relative to the gyro. In either case, the error signals control the motors to move the gyro housing to the position of the gyro.

The gyro may also be controlled by applying suitable torques for precessing the gyro to the desired position. During normal operation, follow-up motors controlled by error signals cause the follow-up member to follow the movements of the gyro. During abnormal conditions, when the error signal becomes abnormally large, my anti-tumbling apparatus becomes operative and applies torque to the gyro causing it to precess in a manner to reduce positional deviation between the gyro and its follow-up thereby preventing caging and also reducing the abnormally large error signal. Since the anti-tumbling amplifier should not operate during normal operation of the gyro and its related follow-up apparatus, devices are provided for rendering the anti-tumbling amplifier operative only when the error signal exceeds a predetermined magnitude. Since the anti-tumbling control operates through the same apparatus which controls the application of torque for precessing the gyro to a desired position, it is also desirable to disconnect the anti-tumbling apparatus from the torque control apparatus during normal operation. For this purpose, apparatus is provided which disconnects the anti-tumbling apparatus until the error signal exceeds a predetermined magnitude.

Referring now to Fig. 1, there is shown a free gyro having a rotor casing 11 supporting a rotor 12 for rotation about a spin axis 13. The gyro structure is supported in a bracket 14 mounted on a shaft 15 for rotation about a normally vertical axis. A follow-up member or housing 16 is supported by shafts 17 and 18 for rotation in the bracket 14 about a normally horizontal axis.

Shafts 19 and 21 journaled in the follow-up member 16 carry a gimbal ring 22 which is rotatable about the axis of shafts 19 and 21. The rotor case 11 is supported by shafts 23 and 24 journaled in the gimbal ring 22 to permit rotation of the gyro about the axis of shafts 23 and 24.

The follow-up member 16 carries a pair of pick-offs shown as well-known E transformers 26 and 27 which cooperate with armatures 28 and 29 to produce error signals corresponding to positional deviations between the gyro and the follow-up member 16 about horizontal and vertical axes, respectively. The armature 28 is carried by an arm 31 on the gimbal ring 22, whereas the armature 29 is carried by an arm 32 on bail ring 33 that is supported by shafts 34 and 35 and has a slot 36 engaging rod 37 projecting from the gyro rotor 12. With this arrangement, movement of the gyro about the axis of shafts 23 and 24 is transmitted to the bail ring 33 which controls armature 29 for the E transformer 27.

The position of the gyro may be controlled by azimuth and elevation control signals transmitted by conductors 41 and 42 to azimuth and elevation amplifiers 43 and 44 which cause azimuth and elevation torque motors 45 and 46 that are connected by shafts 21 and 35 to apply torques to the gyro about horizontal and vertical axes, respectively. When the gyro precesses or when the follow-up member 16 is disturbed, pick-offs 26 and 27 produce error signals corresponding to elevation and azimuth deviations between the gyro 11 and the follow-up member 16. These error signals are supplied to elevation and azimuth follow-up amplifiers 48 and 49 which are connected to elevation and azimuth follow-up motors 51 and 52, respectively.

The azimuth follow-up motor 52 drives through suitable gearing 54 to rotate the shaft 15 which turns the bracket 14 and the entire gyro structure in azimuth about a vertical axis. An azimuth transmitter T may also be driven from follow-up motor 52 to feed the bearing angle into the fire control computer or actuate other remote bearing indicators. The elevation follow-up motor 51 drives shaft 55 forming one input of a compensating differential 56; the other input as represented by gear 57 is driven according to the azimuth position of the bracket 14 from gearing 54. Motor 51 may likewise actuate an elevation transmitter T' for a purpose similar to the transmiter T. Output gear 58 of the differential 56 drives through gearing 59, bevel gearing 61, shaft 62, bevel gearing 63, shaft 64 and bevel gearing 65 to rotate the shaft 18, which turns the follow-up member 16 in elevation about a horizontal axis. The compensating differential is provided so azimuth movement of the bracket 14 will not actuate shaft 62 to cause elevation movement of the follow-up member 16.

The follow-up system thus far described is conventional for controlling a follow-up member, such as the member 16, to follow the movement of a three-degrees-of-freedom gyro, and includes apparatus which may respond to control signals such as those supplied by leads 41 and 42 for applying precession torques to control the position of the gyro.

As previously stated, rapid acceleration or high velocities of either the gyro or the follow-up member may cause caging of the gyro when arms 31 and 32 strike the ends of slots 71 and 72 formed in plates 73 and 74 carried on the follow-up member 16. If the arms 31 and 32 do engage the limits of the slots 71 and 72 and the gyro is thereby caged, torques are applied to the gyro which cause precession of the gyro about an axis perpendicular to that about which the torque is applied. This results in excessive and undesired precession of the gyro referred to herein as tumbling which temporarily renders the system useless as a base line for fire control. By my invention the gyroscope is caused to precess with the follow-up frame upon approach of the gyro to the stop so that the gyro never strikes the stop. While it is recognized that since such precession temporarily reduces the utility of the gyroscope as a reference about the precession axis, it leaves the gyroscope undisturbed about the other horizontal axis, namely, the axis about which the torque is applied so that the gyroscope still has utility as a base line about one axis in the system. Also, since such extreme conditions as give rise to the operation of this invention are only of temporary duration, the gyroscope is only temporarily disturbed and proper operation is speedily resumed, which will not be the case of the gyroscope were tumbled, because of the wide deviation of the gyroscope caused thereby.

According to my invention, elevation and azimuth anti-tumbling amplifiers 77 and 78 are connected to pick-off transformers 26 and 27 through potentiometers 81 and 82. These anti-tumbling amplifiers respond to abnormal error signals from the pick-offs to control azimuth and elevation torque motor amplifiers 43 and 44 which cause torque motors 45 and 46 to apply such torques as may be necessary to reduce the positional deviation between the gyro rotor 12 and the follow-up member 16, thereby reducing abnormal error signals. Potentiometers 81 and 82 are adjusted so the anti-cage amplifiers 77 and 78 become operative when the error signals from pick-off transformers 26 and 27 are so great that arms 31 and 32 approach the limit of their free movement.

Fig. 2 shows a schematic wiring diagram of the preferred form of the torque motor and anti-tumbling amplifiers, together with their connections to the torque motors and the pick-off transformers as well as the source of control signal. These amplifiers are identical, so only one is shown. Since these amplifiers are identical only one is illustrated and described; it will be obvious to those skilled in the art that this amplifier may be used for either the azimuth or elevation control.

Considering Fig. 2 to show the amplifiers for the elevation control, a precession control signal is supplied as by lead 42 to grid 101 of buffer amplifier 102 to produce a voltage across load resistor 103 corresponding to the control signal which is supplied through coupling condenser 104 to grid 105 of tube 106 connected in a phase splitting circuit to produce balanced signals across anode and cathode load resistors 107 and 108, respectively. This balanced signal is supplied through coupling condensers 109 and 111 to grids 112 and 113 of amplifiers 114 and 115 that are arranged in a balanced circuit to provide a differential A. V. voltage across cathode resistors 117 and 118 corresponding in phase and magnitude to the control signal.

Transformer 121 has its primary winding 122 connected across cathode resistors 117 and 118 and its secondary windings connected in a full-wave balanced demodulator circuit including four diodes 124, 125, 126 and 127 that are connected in pairs to terminals of secondary windings 128 and 129 of transformers 131 and 132 having their primaries 133 and 134 connected in series to a source 135 alternating potential that is preferably harmonically related to the control signal supplied by lead 42. With this arrangement, a differential unidirectional voltage is produced across load resistors 136 and 137 in the balanced demodulator circuit and is applied through suitable filter networks to grids 141 and 142 of voltage amplifier tubes 143 and 144 that are connected in a conventional balanced direct current amplifier circuit.

Since the differential unidirectional voltage across load resistors 136 and 137 has a polarity and magnitude corresponding to the phase and magnitude of the control signal, an amplified differential unidirectional voltage is produced across load resistors 145 and 146 of the direct current amplifier circuit and is applied directly to control grids 148 and 149 of power amplifier tubes 151 and 152.

Anodes 153 and 154 of the power amplifier tubes 151 and 152 are connected through opposite halves of field winding 156 for torque motor 46 to a source 157 of positive potential. Since the direction difference between the currents drawn by power amplifier tubes 151 and 152 depends upon the polarity and magnitude of the differential unidirectional voltage applied to the control grids of these tubes, which in turn depends upon the phase and magnitude of the control signal, the torque developed by armature 159 of the torque motor 46 also depends upon the phase and magnitude of the control signal.

The torque motor control amplifier thus far described is of more or less conventional design and taken alone does not form a part of the present invention.

As already described, the anti-tumbling amplifier 77 cooperates with the torque motor control amplifier 44 in response to abnormal error signals caused by abnormal deviation between the gyro and its follow-up member to apply torques or to modify the torques being applied to the gyro in a manner such that the excessive error signal is reduced by appropriate precession of the gyro.

Elevation pick-off transformer 26 has its center leg 163 connected to a source 164 of alternating potential and its outer legs 165 and 166 provided with windings connected in series opposition, so the voltage produced across potentiometer 167 (represented by 81 in Fig. 1) depends upon the difference between the voltages induced in the two windings. Since the voltages induced in these windings vary oppositely according to the position of armature 28, relative to the transformer 26, the difference between the two voltages as represented by the voltage across potentiometer 167 depends upon the relative positions of the follow-up member 16 and the gyro rotor 12. The alternating voltage produced across potentiometer 167 is of a phase and magnitude dependent upon the direction and amount of the positional displacement between transformer 26 and armature 28. This voltage is supplied as by lead 171 to the elevation follow-up amplifier 48 which controls the elevation follow-up motor 51 to position the follow-up member 16 in a manner to reduce the error signal.

This error signal is also supplied as by lead 172 connected to slider 173 of potentiometer 167 to a cold cathode type gas-filled discharge device in the form of a neon tube 175 which is rendered conductive when the error signal exceeds a predetermined value dependent upon the position of slider 173. When the error signal does exceed this predetermined value, a voltage having a phase and magnitude corresponding to the direction and amount of the error is supplied through coupling condenser 176 across grid leak 177 to grid 178 of amplifier tube 179. In this manner, currents corresponding to the error signal are produced in primary winding 181 of transformer 182 having its secondary windings 183 and 184 connected in a conventional balanced demodulator circuit, including diodes 185 and 186. The circuit is so arranged that signals corresponding to the error are applied in phase opposition to the diodes, whereas signals from alternating voltage source 187 synchronized with the source 164 are supplied in like phase to the diodes 185 and 186.

In this type of demodulator circuit, a differential unidirectional voltage is produced across load resistors 187 and 188 of a polarity and magnitude corresponding to the phase and amplitude of the error signal from the pick-off transformer 26, which depends upon the direction and amount of the deviation between the gyro and its follow-up member. This unidirectional voltage is supplied through suitable filter networks 189 and 191 to grids 192 and 193 of amplifier tubes 194 and 195 to produce a differential unidirectional voltage across load resistors 196 and 197, and is dependent upon the direction and magnitude of the deviation between the gyro and its follow-up member.

Since the neon tube 175 is normally "out," the anti-cage or anti-tumbling amplifier is normally inoperative. When the error signal from the pick-off transformer 26 is sufficient to flash the tube 175, the anti-tumbling amplifier becomes operative and a differential unidirectional voltage is produced across resistors 196 and 197 of a polarity and magnitude dependent upon the phase and amplitude of the error signal.

When the anti-tumbling amplifier is operative, as when neon tube 175 is conductive, neon tubes 198 and 199 also become conductive to supply the anti-tumbling signal from resistors 196 and 197 through suitable coupling resistors 201 and 202 directly to control grids 148 and 149 of the power amplifier tubes 151 and 152 in the final stage of the torque motor control amplifier. The circuit elements are so selected and arranged that the voltage from the anti-tumbling amplifier applied to control grids 148 and 149 adjusts the currents drawn by power amplifier tubes 151 and 152 in a manner such that the torque motor 46 applies a torque to the gyro, so it precesses in a direction to move the armature 28 to reduce the error signal.

If the abnormal error signal is caused by precession of the gyro, such precession is, in turn, caused by control signal at lead 42. In this event, the anti-tumbling amplifier merely serves to oppose the control signal so the torque applied does not precess the gyro to cause abnormal error signals from the pick-off 26. On the other hand, abnormal error signals produced by movement of the follow-up member 16 operate the anti-tumbling amplifier to control the torque motor by controlling power amplifier tubes 151 and 152 to actually precess the gyro to move in the same direction as the follow-up member so the error does not exceed a predetermined maximum. In both cases, the gyro is controlled by controlling the torque applied by motor 46 so the gyro precesses in a manner to reduce the error signal.

If the anti-tumbling amplifier were continuously connected to the control grids 148 and 149 during its inoperative as well as its operative periods, it would act as a continuous load on the torque motor control amplifier. It is to avoid this that neon tubes 198 and 199 are inserted between the anti-cage amplifier and the torque motor control amplifier. Since these tubes are conductive only when the anti-tumbling amplifier is operative, they serve during inoperative periods of the anti-tumbling amplifier to disconnect it from the torque motor control amplifier.

From the foregoing it is apparent that my invention will prevent tumbling of the gyroscope by preventing contact between the gyro and its follow-up system under all ordinary operating conditions and regardless of how fast the operator slews the control element (the sight or gun). As the rate of movement of the control element increases, an increased torquing current is fed into the torque motor 45 or 46 as the case may be, causing faster and faster precession of the gyroscope. As soon, however, as the rate of precession exceeds the capacity of the motor 52 or 51 to follow, an increasing error or displacement of the gyro with respect to the follow-up system will appear causing an increase in the error signal generated by the effected E-pick-off 26 or 27. This signal is then fed through the proper azimuth or elevation anti-tumbling amplifier to oppose the precessing control signal being fed into the amplifier 33 or 44 thereby reducing the precession rate of the gyroscope sufficiently to prevent further relative displacement. Thus the precession rate of the gyroscope is reduced to the angular rate of which the follow-up system is capable. While this results in a temporary error, the error is much less than would be caused if the gyro struck a stop causing it to tumble.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a follow-up control system for a gyro having a pick-off for producing an error signal, upon relative displacement of said gyro and follow-up from a predetermined relationship, means controlled by said signal for causing the follow-up member to maintain said predetermined position with respect to the gyro, torque applying means for precessing said gyro, and means responsive to an error signal from said pick-off of more than a predetermined magnitude for modifying said torque applying means to precess said gyro in a manner to reduce said error signal.

2. A gyro control system comprising a gyro, torque applying means for precessing said gyro, a follow-up member, a pick-off interposed between said gyro and said member for producing a signal corresponding to positional deviation between said gyro and said member, a follow-up motor controlled by said signal for driving said member tending to maintain a predetermined position relative to said gyro, and anti-tumbling means also controlled by said pick-off for actuating said torque applying means to precess said gyro in a manner to reduce said deviation.

3. A gyro control system comprising a gyro, torque applying means for precessing said gyro, a follow-up member, a pick-off interposed between said gyro and said member for producing a signal corresponding to positional deviation between said gyro and said member, follow-up means controlled by said signal for driving said member tending to maintain a predetermined position relative to said gyro, anti-tumbling means adapted to be controlled by said pick-off for actuating said torque applying means to precess said gyro in a manner to reduce said deviation, and means responsive to a signal from said pick-off of a predetermined magnitude for rendering said anti-tumbling means operative.

4. A gyro control system comprising a gyro, variable torque applying means for precessing said gyro, a follow-up member, a pick-off interposed between said gyro and said member for producing a signal proportional to the amount of positional deviation between said gyro and said member, follow-up means of limited speed controlled by said pick-off for driving said member tending to maintain a predetermined position relative to said gyro, control means for variably exciting said torque applying means to cause precession of said gyro at a desired rate, and anti-tumbling means responsive to abnormal deviation between said gyro and said member for limiting the strength of said torque applying means below that producing precession in excess of the angular rate of which the follow-up means is capable.

5. A gyro control system comprising a gyro, torque applying means for precessing said gyro, a follow-up member, a pick-off interposed between said gyro and said member for producing a signal corresponding to positional deviation between said gyro and said member, follow-up means controlled by said pick-off for driving said member tending to maintain a predetermined position relative to said gyro, primary control means for actuating said torque applying means to control precession of said gyro, anti-tumbling means responsive to abnormal deviation between said gyro and said member for further controlling said torque applying means to precess said gyro in a manner to reduce said deviation, and means controlled according to the magnitude of said signal for connecting said anti-tumbling means to said torque applying means.

6. A gyro control system comprising a gyro, torque applying means for precessing said gyro, a follow-up member, a pick-off interposed between said gyro and said member for producing a signal corresponding to positional deviation between said gyro and said member, follow-up means controlled by said pick-off for driving said member tending to maintain a predetermined position relative to said gyro, anti-tumbling means adapted to be controlled by said pick-off for actuating said torque applying means to precess said gyro in a manner to reduce said deviation, means responsive to a signal from said pick-off of a predetermined magnitude for rendering said anti-tumbling means operative, and means controlled according to the magnitude of said signal for connecting said anti-tumbling means to said torque applying means.

7. In combination, a gyro, a follow-up member therefor, a pick-off interposed between said gyro and said member for producing a signal corresponding to positional deviation between said gyro and said member, follow-up means controlled by said signal for driving said member tending to maintain a predetermined position relative to said gyro, and means operative when said signal exceeds a predetermined magnitude for reducing the precession rate of said gyro.

8. In combination, a gyro, a follow-up member therefor, a pick-off interposed between said gyro and said member for producing a signal corresponding to positional deviation between said gyro and said member, follow-up means controlled by said signal for driving said member tending to maintain a predetermined position relative to said gyro, torque applying means for controlling the precession of said gyro, and means responsive when said signal exceeds a predetermined magnitude for reducing said torque to prevent any further increase in said deviation.

GEORGE C. NEWTON, JR.

REFERENCES CITED

The following references are of record in the file of this patent:

UNITED STATES PATENTS

| Number | Name | Date |
| --- | --- | --- |
| 2,273,309 | Zand | Feb. 17, 1942 |
| 2,280,116 | Carlson | Apr. 21, 1942 |
| 2,383,409 | Newell | Aug. 21, 1945 |
| 2,414,108 | Knowles et al. | Jan. 14, 1947 |